(12) United States Patent
Schmitz

(10) Patent No.: US 9,028,060 B2
(45) Date of Patent: May 12, 2015

(54) METHOD AND DEVICE FOR IMPROVING AIMING ABILITY

(71) Applicant: Charles J. Schmitz, O'Fallon, MO (US)

(72) Inventor: Charles J. Schmitz, O'Fallon, MO (US)

( * ) Notice: Subject to any disclaimer, the term of this patent is extended or adjusted under 35 U.S.C. 154(b) by 0 days.

(21) Appl. No.: 13/913,967

(22) Filed: Jun. 10, 2013

(65) Prior Publication Data

US 2014/0362336 A1 Dec. 11, 2014

(51) Int. Cl.
G02C 7/00 (2006.01)
G02C 5/00 (2006.01)
G02C 7/08 (2006.01)
G02C 7/16 (2006.01)

(52) U.S. Cl.
CPC ............... G02C 5/003 (2013.01); G02C 7/086 (2013.01); G02C 7/16 (2013.01)

(58) Field of Classification Search
CPC ..................................... G02C 7/10; G02C 7/12
USPC .............................................. 351/53, 158, 41
See application file for complete search history.

(56) References Cited

U.S. PATENT DOCUMENTS

| | | | |
|---|---|---|---|
| 1,340,579 A | 5/1920 | Tousey | |
| 2,895,376 A | 7/1959 | Linder, Jr. | |
| 3,628,854 A * | 12/1971 | Jampolsky | 351/159.58 |
| 4,761,196 A | 8/1988 | Brown | |
| 5,541,675 A | 7/1996 | Hickey | |
| 5,726,731 A * | 3/1998 | Toler | 351/53 |
| 7,147,320 B2 | 12/2006 | Werner | |
| 2006/0238699 A1 | 10/2006 | Carter | |
| 2008/0034637 A1 | 2/2008 | Summers | |

OTHER PUBLICATIONS

David Burr, John Ross, Vision: The World through Picket Fences, Current Biology, vol. 14, Issue 10, May 25, 2004, pp. R381-R382, ISSN 0960-9822, 10.1016/j.cub.2004.05.011.(http://www.sciencedirect.com/science/article/pii/S0960982204003331).

* cited by examiner

Primary Examiner — Hung Dang
(74) Attorney, Agent, or Firm — Grace J. Fishel

(57) ABSTRACT

A shooter aims his equipment, such as a gun or bow, in the normal fashion with the optical axis of the aiming eye aligned with the gun's front and rear sights towards a target. A thin optical filter manufactured with alternating transparent and solid spaces is applied to the shooter's protective glasses on the lens of the non-aiming eye. The shooter proceeds to aim with both eyes open having only the non-aiming eye's vision filtered. The aiming eye's perceived dominance is increased by reducing the visual signal sent to the brain from the non-aiming eye.

10 Claims, 2 Drawing Sheets

METHOD AND DEVICE FOR IMPROVING AIMING ABILITY

BACKGROUND

1. Field of the Invention

This invention pertains to a method and device for improving the performance of shooters who shoot shotguns, pistols, bows and arrows and other shooting equipment.

Aiming shooting equipment is commonly known and done by aligning one eye, called the aiming eye, with the shooting equipment's sights in a line towards the desired target. The aiming eye sends that visual signal to the brain which perceives it as the aligned image. Since this alignment with the sights and the target is linear, and since the shooter's eyes are separated by some distance, alignment with the shooting equipment can be done using only one of the two eyes. The eye that is not aligned with the sights, the non-aiming eye or off-eye, will also send a visual signal to the brain, however, this perceived image is not in alignment with the sights and the target. The shooter's visual perception is the brain's combination and interpretation of these two signals of the visible light.

Many shooters have a dominant eye which means one eye naturally sends the brain a much stronger visual signal than the other eye. For optimum performance a shooter desires to have a stronger visual signal sent from the aiming eye which is correctly aligned. The proper aiming alignment of the shooting equipment towards the target is then easily perceived as the stronger of two images.

Shooters are hampered by conditions such as cross-dominant vision, where the off-eye sends the stronger visual signal or middle-dominant vision, where both eyes send an equally strong visual signal. With both conditions, the proper aiming alignment of the shooting equipment towards the target is not easily perceived by the shooter. The stronger signal from the off-eye dominates the visual image perceived and it is the wrong alignment for proper aim.

One solution to the problems is to close the off-eye so only the aiming eye's visual signal is processed by the brain. Closing the off-eye eliminates one of the two competing images but produces monocular vision which is less desirable than binocular vision. Binocular vision provides a larger field of vision, enhanced detail and greater depth perception and motion perception. Closing one eye will also cause muscle fatigue and other physiological changes which are discussed extensively in prior art and are not desired in shooting. All sources referenced agree that binocular vision is an advantage.

The preferred solution is to reduce the visual signal sent by the off-eye and alter the shooter's eye dominance while leaving binocular vision in place.

2. Description of the Prior Art

For decades the classic method to correct eye dominance problems in shooting has been to simply put translucent tape over one lens of the protective glasses to completely block or occlude the vision of the off-eye. Translucent tape allows some light but no images to pass through and reach the eye. While both eyes are open with this method it results in monocular vision. Without two images being processed by the brain, the advantages of binocular vision that have been discussed are lost using this method.

A more recent method such as U.S. Pat. No. 4,761,196 issued to Brown, et al. dated Aug. 2, 1988 includes translucent circular occlusions attached to the protective glasses that are intended to block a majority of the central vision of the shooter while allowing peripheral vision only.

The stated objective of the method is to shoot with the center of vision of the other eye blanked out. Optometry and vision science indicate that the most acute vision is within the central 30 degrees of an eye's field of vision. When correctly used the result of this method's fixed central vision occlusion is monocular vision which has been discussed as less desirable than binocular vision.

Any partial occlusion that is fixed in front of the eye and approximates the size of the retina can be evaded by normal eye movement up or down and to the left or right. Because of the design, these methods are only effective when the eye is held still in a central position aligned with the occlusion. The desired result is lost when the eye moves off of center to acquire a target.

Another method shown in U.S. Pat. No. 1,340,579 issued to Tousey dated May 18, 1920 combines an opaque or screen occlusion of the off-eye in conjunction with an aperture device covering the aiming eye. This method is not adjustable to the needs of each individual shooter and is a fixed set of glasses and is not compatible with a shooter needing corrective lenses.

Another method shown in U.S. Pat. No. 7,147,320 issued to Werner dated Dec. 12, 2006 also combines an opaque or screen occlusion of the off-eye in conjunction with an aperture device covering the aiming eye. While this method is removable and compatible with corrective lenses, it is not adjustable to each shooter's needs. The opaque occlusion intended to block the entire off-eye's field of view results in one image reaching the brain and monocular vision.

Similar to the preceding, U.S. Pat. No. 5,541,675 issued to Hickey dated Jul. 30, 1996 combines an opaque occlusion of the off-eye in conjunction with an aperture device covering the aiming eye. This is another version of allowing some light but no image to reach the off-eye.

Prior art has provided several methods and devices which attempt this corrective action. Each one provides some benefit while creating adverse effects to aiming ability at the same time. This invention provides the shooter with the ability to reduce the non-aiming eye's dominance, to vary the amount of that reduction to his specific need, and to aim with both eyes open preserving binocular vision across the entire field of view. It can be used with any type of eye protection and is removable. None of the inventions in prior art embodies all of these advantages.

BRIEF SUMMARY OF THE INVENTION

A primary objective of the invention is to provide a method and device for aiding shooters and others who must perform an aiming operation with the ability to do so with two eyes open, with greater comfort, without adverse physiological effects and with greater accuracy.

Another objective is to provide a method and device to obtain maximum accuracy despite having cross dominant vision or middle dominant vision allowing a shooter who aims using his or her non-dominant eye to keep the non-aiming eye open to preserve the advantages of substantially normal binocular vision across the entire field of view.

Briefly stated, the device is a thin transparent material manufactured with a light filtering pattern of alternating transparent and non-transparent spaces which is removably attached to the shooter's protective glasses only on the side of the non-aiming eye. The transparent sections allow light to pass through while the non-transparent or solid spaces block light. Only portions of the light pass through and the light waves are therefore filtered before they reach the eye. The amount of the visual signal filtered is varied by changing the pattern of alternating transparent and solid spaces. More solid spaces allow less light to pass through the filter. More transparent spaces allow more light to pass through the filter.

The brain receives a visual signal from the non-aiming eye that is intermittently obstructed and therefore incomplete. However, the perception is a complete image because the brain naturally fills in or completes the missing parts of the signal received. A simple example of this phenomenon can be demonstrated by looking at an object in the distance with both eyes open. Hold one hand about six inches in front of either eye and spread the fingers apart slightly. The object continues to appear whole and unobstructed while the fingers are faintly perceived in the foreground. This invention is designed to take advantage of this adaptive process of the brain by filtering light rather than occluding light.

DETAILED DESCRIPTION OF THE INVENTION

Figure 5:
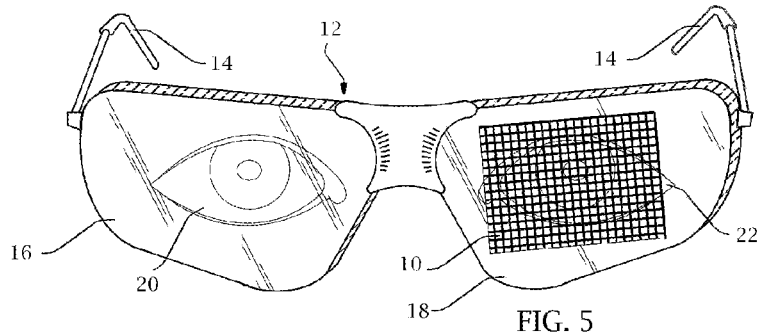
FIG. 5 is a similar slight perspective view that shows a shooter's eyes behind the protective glasses with an optical filter with a grid pattern adhered to the left lens of the glasses. This is the configuration used by a right handed shooter aiming with his right eye having his left eye or non-aiming eye filtered.

Attention is first invited to FIG. 5 for a description of the method and device for improving aiming ability. For safety shooters will wear protective glasses 12 while shooting, which are held in place on the head by common earpieces 14.

Illustrated is a shooter that will shoot right handed and aim with his right eye 20. The left eye 22 is the non-aiming eye also referred to as the off-eye. The protective glasses 12 have a right lens 16 and a left lens 18 which shield the respective eyes. An optical filter with a grid pattern 10 is removably adhered to only the left lens 18 to reduce the amount of light received by the non-aiming eye. The alternating transparent and solid spaces of the filter allow intermittent light waves to reach the eye. Through a process known as amodal perception the whole image is perceived even though parts of the visual signal never reach the eye's retina. The filter produces the same visual phenomenon as looking through a window screen, a venetian blind or through a picket fence while in a moving vehicle. The image on the other side of the obstruction is perceived as a complete image while the filtering medium, screen, venetian blind or fence posts being looked through is weakly perceived.

Figure 6:
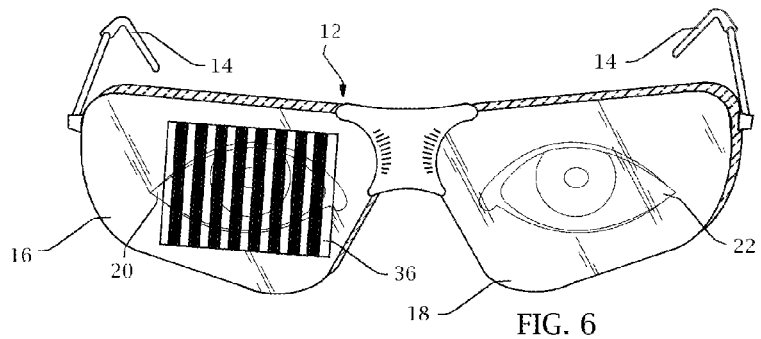
FIG. 6 is similar to the preceding figure except that an optical filter with a parallel line pattern is adhered to the right lens of the glasses. This is the configuration used by a left handed shooter aiming with his left eye having his right eye or non-aiming eye filtered.

FIG. 6 is similar to FIG. 5. Again the shooter is wearing protective glasses 12 while shooting, which are held in place on the head by common earpieces 14. Illustrated is a shooter that will shoot left handed and aim with his left eye 22 now the aiming eye. The right eye 20 is now the non-aiming eye or the off-eye. The protective glasses 12 have a right lens 16 and a left lens 18 which shield the respective eyes. An optical filter with a parallel line pattern 36 is adhered to only the right lens 16 to reduce the amount of light received by the non-aiming eye. The non-aiming eye's retina receives a filtered visual signal. The whole image is perceived even though parts of the visual signal never reach the eye's retina.

Figure 4:
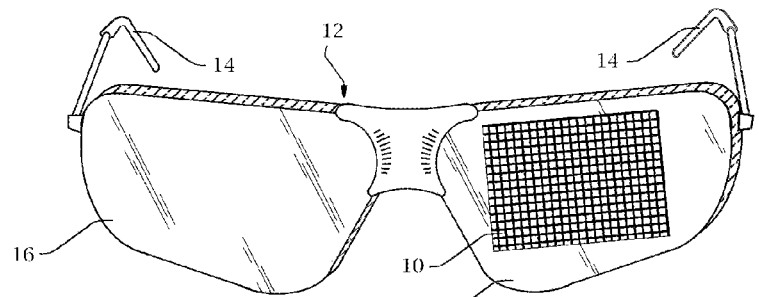
FIG. 4 is a slight perspective view of protective glasses that are commonly worn during shooting. An optical filter with a grid pattern has been adhered to the left lens of the glasses.

FIG. 4 is a view of the shooter's protective glasses 12 described in the paragraphs above, which are held in place on the head by common earpieces 14. An optical filter 10 with a grid pattern adhered to the left lens 18 while the right lens 16 is unfiltered. In this figure the glasses are not positioned on the shooter's face protecting the shooter's eyes. Glasses used for shooting may be clear, tinted, for vision correction or exclusively for safety. This invention is adaptable to all types of glasses, lenses, goggles and shields that may be used in shooting activities.

Figure 7:
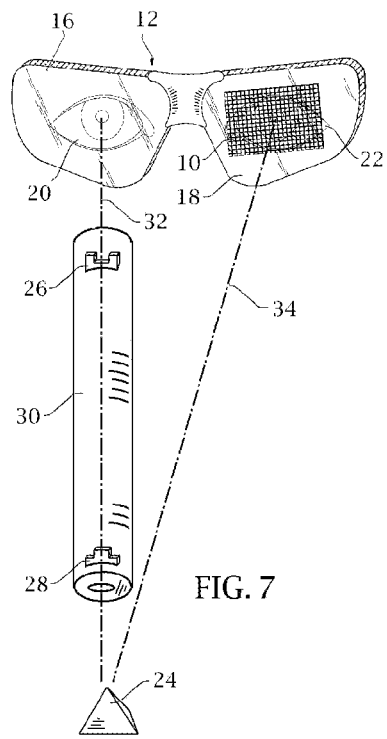
FIG. 7 is a plan diagrammatic view of a shooter's alignment of his right eye across the rear and front sights of a gun, towards a target. The left eye or non-aiming eye's alignment is shown and is not in alignment with the gun's sights towards the target. The shooter's left eye is behind an optical filter with a grid pattern reducing the amount of light reaching that eye.

Attention is now invited to FIG. 7 which shows a diagram of a shooter that is wearing protective glasses 12 with a left lens 18 and a right lens 16. The shooter is aiming a gun with a long barrel 30 such as a shotgun. The barrel 30 of the gun has a rear sight 26 and a front sight 28 which are used to aim. The shooter holds the gun barrel 30 in a position where there is linear alignment from the shooter's right eye 20 or aiming eye across the gun's rear sight 26 continuing across the gun's front sight 28 towards the target object 24. The right eye 20 or aiming eye sends the brain a visual signal of this correct visual alignment 32 towards the target object 24. The left eye 22 or non-aiming eye also sends a visual signal to the brain. This incorrect visual alignment 34 towards the target object 24 is also shown. The non-aiming eye's visual picture of the target object 24 is not in line with the gun's sights and is therefore the wrong visual picture for the shooter to use for aiming. The two visual signals sent by the two eyes are combined by the brain which the shooter uses to perceive, aim and perform the shooting activity. The solid lines of the optical filter 10 with a grid pattern block light while the transparent spaces allow light to pass through to the left eye 22 across the full field of vision. The left eye 22 or non-aiming eye receives less light that it would without the filter in place. Different strengths of optical filters with more or less transparent space are used to allow more or less light to pass through and vary the corrective action of the filtering process. The brain's perception of the image sent by the left eye 22 will be reduced as more light is blocked by a filter. The result is a perceived increase in the strength of the non-filtered eye's image. The filtering can be tailored to the shooter's need based on that individual's particular natural eye dominance.

Figure 8:
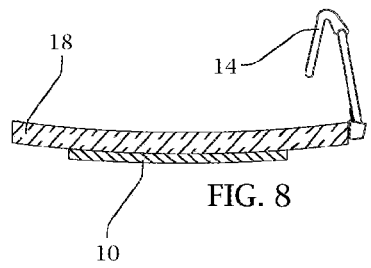
FIG. 8 shows a top view of the left lens of the protective glasses with a thin optical filter in place wherein the optical filter has been adhered to the outside of the lens.

FIG. 8 is a top view of part of the protective glasses showing the left lens 18 and the earpiece 14. The optical filter 10 is adhered to the outside of the lens in this diagram.

Figure 9:
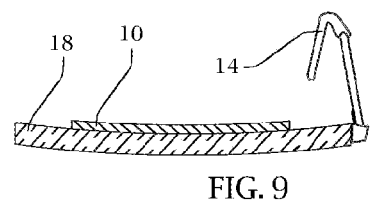
FIG. 9 is similar to the preceding figure except that the optical filter has been adhered to the inside of the lens.

FIG. 9 is similar to the prior figure. Again it is a top view of part of the protective glasses showing the left lens 18 and the earpiece 14. The optical filter 10 is adhered to the inside of the lens in this diagram. In this configuration the filter functions to block light in the same way it does when adhered to the outside of the lens. Placement on the inside of the lens may be desired for concealment in some applications.

Figure 1:
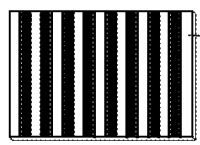
FIG. 1 is a front view of a thin optical filter made of transparent material and printed with a pattern of alternating transparent and solid spaces in the form of vertical parallel lines.

FIG. 1 shows an optical filter 36 with a parallel line pattern which is made of a thin transparent material printed with a pattern of alternating transparent and solid spaces in the form of vertical parallel lines.

Figure 2:
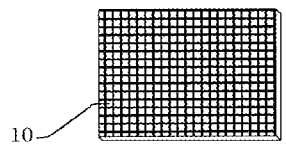
FIG. 2 is also a front view of a thin optical filter made of transparent material. This filter variation has a printed pattern of alternating transparent and solid spaces in the form of both vertical and horizontal lines which forms a grid.

FIG. 2 shows an optical filter 10 with a grid pattern which is made of a thin transparent material printed with a pattern of alternating transparent and solid spaces in the form of both vertical and horizontal parallel lines which forms a grid.

Figure 3:
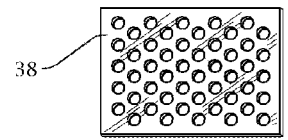
FIG. 3 is also a front view of a thin optical filter. This filter variation is a made of an opaque material that has perforations in a pattern that creates alternating transparent and solid spaces.

FIG. 3 shows an optical filter 38 with perforations which is made of a thin opaque material that has perforations in a pattern that creates alternating transparent and solid spaces.

Figure 10:
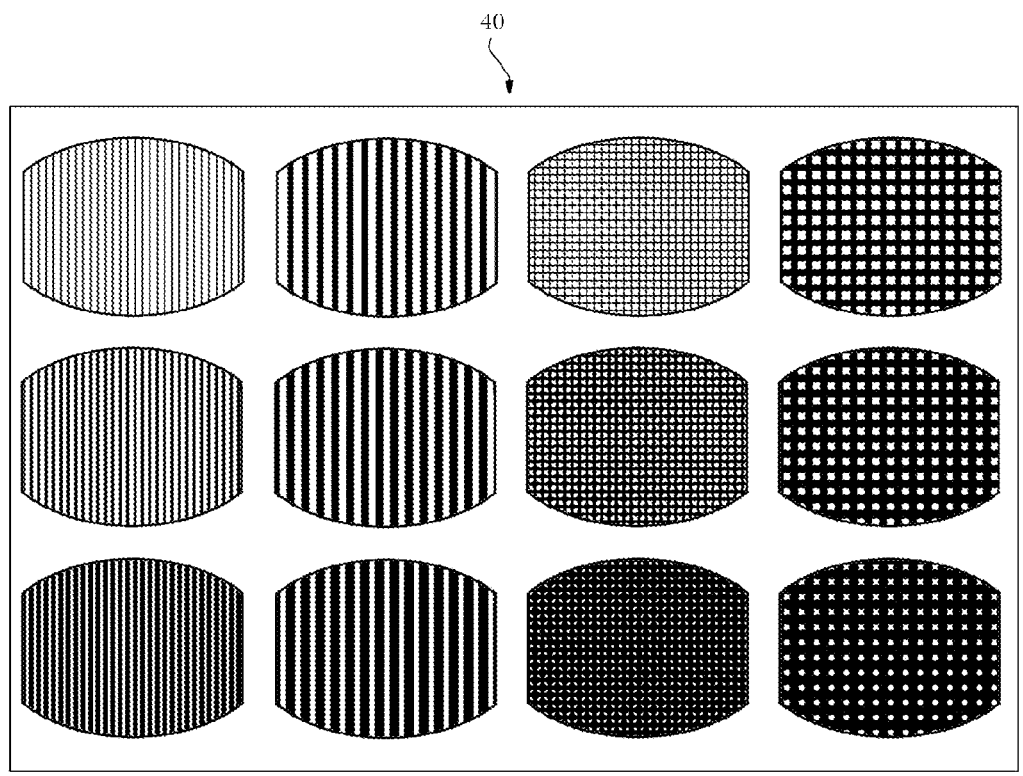
FIG. 10 is a front view of a sheet of optical filters printed on a thin transparent material. Each filter has a different pattern and blocks a different amount of light.

FIG. 10 shows a sheet of optical filters 40 which have been printed on a thin transparent material. This is an example of one possible configuration that may be produced for commercial sale to shooters. This product would give the shooter twelve filters which can be interchanged each with a different pattern, each filtering a different amount of light. The sheet is produced using static cling vinyl making them removable and reusable. In this example the filters are kiss cut with a coated paper backing to hold the filters until used.

I claim:

1. A method of improving aiming ability when shooting such equipment as guns and bows and arrows or the like while wearing protective glasses, comprising the steps of:
    attaching a thin optical filter with alternating transparent and non-transparent spaces to a non-aiming lens of the shooter's protective glasses,
    aiming at a target object using the opposite aiming eye by aligning the optical axis of the eye directed along the shooting equipment's sighting devices towards a target
    viewing the target with both eyes open, whereby the image viewed through the filter on the non-aiming lens is encoded through a process of amodal perception which results in a perceived increase in the strength of the non-filtered, aiming eye's image.

2. The method according to claim 1 wherein for a right handed shooter said optical filter is attached to the left lens of said shooters protective glasses and for a left handed shooter said optical filter is attached to the right lens of said shooter's protective glasses.

3. The method according to any one of claim 1 or 2 wherein static cling attraction is used to adhere said optical filter to said protective glasses lens.

4. The method according to any one of claim 1 or 2 wherein adhesive is used to adhere said optical filter to said protective glasses lens.

5. The method according to any one of claim 1 or 2 wherein mechanical fasteners are used to adhere said optical filter to said protective glasses lens.

6. The method according to any one of claim 1 or 2 wherein the optical filter is adhered to the outside of said protective glasses lens.

7. The method according to any one of claim 1 or 2 wherein the optical filter is adhered to the inside of said protective glasses lens.

8. The method according to any one of claim 1 or 2 wherein said optical filter is manufactured from a transparent material printed with a pattern of alternating transparent and solid spaces.

9. The method according to any one of claim 1 or 2 wherein said optical filter is manufactured from an opaque material perforated in a pattern of alternating open and solid spaces.

10. The method according to any one of claim 1 or 2 wherein said optical filter is a grid formed of opaque and transparent lines.

* * * * *